(12) United States Patent
Vanstone et al.

(10) Patent No.: US 7,877,610 B2
(45) Date of Patent: *Jan. 25, 2011

(54) HYBRID SIGNATURE SCHEME

(75) Inventors: Scott Alexander Vanstone, Waterloo (CA); Robert Gallant, Mississauga (CA); Robert J. Lambert, Cambridge (CA); Leon A. Pintsov, West Hartford, CT (US); Frederick W. Ryan, Jr., Oxford, CT (US); Ari Singer, Hamden, CT (US)

(73) Assignees: Certicom Corp., Mississauga, Ontario (CA); Pitney Bowes Inc., Stamford, CT (US)

( * ) Notice: Subject to any disclaimer, the term of this patent is extended or adjusted under 35 U.S.C. 154(b) by 587 days.

This patent is subject to a terminal disclaimer.

(21) Appl. No.: 11/812,811

(22) Filed: Jun. 21, 2007

(65) Prior Publication Data

US 2008/0141036 A1 Jun. 12, 2008

Related U.S. Application Data

(63) Continuation of application No. 09/390,362, filed on Sep. 7, 1999, now Pat. No. 7,249,259.

(51) Int. Cl.
*H04L 9/00* (2006.01)
(52) U.S. Cl. .................................... 713/180; 713/168
(58) Field of Classification Search ................. 713/176, 713/180
See application file for complete search history.

(56) References Cited

U.S. PATENT DOCUMENTS 5,600,725 A   2/1997   Rueppel et al.

(Continued)

FOREIGN PATENT DOCUMENTS

EP   0639907 A1   2/1995

(Continued)

OTHER PUBLICATIONS

Coron, Naccache, Stern: "CRYPTO '99. Proceedings of the 19th Annual International Cryptology Conference: On the security of RSA padding", Aug. 19, 1999, pp. 1-18, Springer-Verlag, Berlin, Germany XP002193618.

(Continued)

*Primary Examiner*—Ponnoreay Pich
(74) *Attorney, Agent, or Firm*—Novak Druce + Quigg LLP

(57) ABSTRACT

A signature scheme is provided in which a message is divided into a first portion which is hidden and is recovered during verification, and a second portion which is visible and is required as input to the verification algorithm. A first signature component is generated by encrypting the first portion alone. An intermediate component is formed by combining the first component and the visible portion and cryptographically hashing them. A second signature component is then formed using the intermediate component and the signature comprises the first and second components with the visible portion. A verification of the signature combines a first component derived only from the hidden portion of the message with the visible portion and produces a hash of the combination. The computed hash is used together with publicly available information to generate a bit string corresponding to the hidden portion. If the required redundancy is present the signature is accepted and the message reconstructed from the recovered bit string and the visible portion.

25 Claims, 3 Drawing Sheets

U.S. PATENT DOCUMENTS 5,915,024 A 6/1999 Kitaori et al.
2001/0046291 A1 11/2001 Vanstone et al.

FOREIGN PATENT DOCUMENTS

| EP | 0918274 A2 | | 5/1999 |
|----|------------|---|--------|
| EP | 1083700 A2 | * | 3/2001 |
| WO | WO 01/10078 A1 | | 2/2001 |

OTHER PUBLICATIONS

Nyberg K et al: "Message Recovery for Signature Schemes Based on the Discrete Logarithm Problem", Designs, Codes and Cryptography, vol. 7, No. 1-2, 1996, pp. 61-81, Kluwer Academic Publishers, Boston, US, XP000905401 ISSN: 0925-1022.

"ISO/IEC FCD 9796-1: Digital signature schemes giving message recovery. Part 1: Mechanisms using redundancy." ISO/IEC JTC1/SC27, No. 2352, Jul. 7, 1999, XP001066549.

"ISO/IEC 9796-2: Digital signature schemes giving message recovery. Part 2: Mechanisms using a hash function." 1997(E), JTC1/SC27.

Menezes, Alfred J. et al., Handbook of Applied Cryptography, p. 363.

Search Report from European Patent Application No. 00119558.51, Mar. 19, 2002.

* cited by examiner

HYBRID SIGNATURE SCHEME

CROSS REFERENCE TO RELATED APPLICATIONS

This application is a continuation of U.S. patent application Ser. No. 09/390,362 filed on Sep. 7, 1999 now U.S. Pat. No. 7,249,259 the contents of which are hereby incorporated by reference.

TECHNICAL FIELD

The present invention relates to methods and apparatus for digitally signing a message.

BACKGROUND OF INVENTION

Digital signatures are used to sign a message generated by a correspondent so that the origin and authenticity of the message may subsequently be verified. In its basic form, a digital signature of a message is generated by signing the message with the originators private key. The message may then be recovered using the originators public key. A number of variants of this basic arrangement have been proposed with different attributes. Digital signature schemes are typically thought to fall into two generic classes, namely digital signatures with appendix and digital signatures with message recovery.

Digital signatures with appendix are categorized by the fact that the message signed is required as input to the verification algorithm. Although very popular (the DSS and ECDSA are examples of this mechanism) they may not provide as much bandwidth efficiency as other methods.

Digital signatures with message recovery are categorized by the fact that the message is not required as input to the verification algorithm. One goal when designing message recovery schemes is to defeat existential forgery attacks by defining a suitable redundancy function which will distinguish messages legitimately signed from signatures of random bit strings.

In many practical applications the data to be signed carries a certain amount of inherent redundancy. For example, four bytes of data might be reserved for the date but, in practice, 3 bytes suffice and so there are 8 bits of redundancy from this field. In order to ensure security it is necessary to provide a predetermined degree of redundancy within the message and accordingly the bandwidth efficiency is reduced.

To increase the bandwidth efficiency it is known to split the message into two components, namely a hidden and a visible component. The hidden component is recovered during the verification process and the visible portion is used as an input to the recovery process. The hidden component must have sufficient redundancy to withstand an existential forgery attack and additional bits must be added to the message if it does not inherently possess this. In one of the proposed standards to implement such a scheme, ISO 9796 Part 2, the hidden component is utilised to generate a signature component c of the form $DES_R[H//SHA1(V)//I_A]$ where H is the hidden component,
V is the visible component
$I_A$ is an identifier of the signer
SHA1(V) is a cryptographic hash of the visible component, and
$DES_R$ is an encryption of the bit string.

This scheme however has the disadvantage that c is at least the number of bits in SHAT(V) bits longer, and, as it is included in the signature, the required bandwidth efficiency may not be achieved. Moreover, the scheme requires invocation of two hash operations as the value c is subsequently hashed for inclusion in the signature component. This computational complexity may make it unsuitable for certain applications.

It is therefore an object of the present invention to provide a signature scheme in which the above disadvantages are obviated or mitigated.

In general terms, one aspect of the present invention provides a signature scheme in which a message is divided in to a first portion which is hidden and is recovered during verification, and a second portion which is visible and is required as input to the verification algorithm. A first signature component is generated by encrypting the first portion alone. An intermediate component is formed by combining the first component and the visible portion and cryptographically hashing them. A second signature component is then formed using the intermediate component and the signature comprises the first and second components with the visible portion.

The generation of the first component from the first portion alone reduces the necessary bandwidth and simplifies the computation. The relative sizes of the first and second portions are determined by the application itself. In this manner, the redundancy function can be application dependent as opposed to a global primitive.

Recovery of the message can be completed using the signature and the public key of the sender.

According to a further aspect of the invention there is provided a verification of a signature of a message that has been subdivided into a hidden and visible portion. The verification combines a first component derived only from the hidden portion of the message with the visible portion and produces a hash of the combination. The computed hash is used together with publicly available information to generate a bit string corresponding to the hidden portion. If the required redundancy is present the signature is accepted and the message reconstructed from the recovered bit string and the visible portion.

BRIEF DESCRIPTION OF THE DRAWINGS

Embodiments of the invention will now be described by way of example only with reference to the accompanying drawings in which.

DETAILED DESCRIPTION OF A PREFERRED EMBODIMENT

Figure 1:
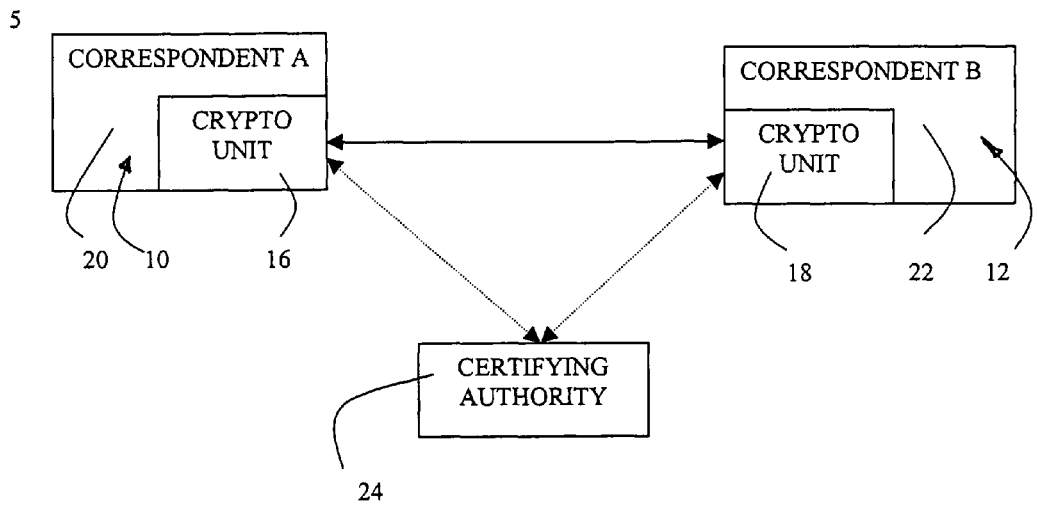
FIG. 1 is a schematic representation of a data communication system.

Referring to FIG. 1, a data communication system includes a pair of correspondents 10, 12 exchanging a message M over a communication channel 14. Each of the correspondents 10, 12 includes a cryptographic unit 16, 18 respectively and a terminal 20, 22 to generate and receive the message M. Each of the cryptographic units 16, 18 implements a public key encryption scheme that enables it to generate a session key, to encipher or decipher a message using the session key or to sign a message using a private key whereby the message can then be recovered using a public key corresponding to the private key. The general implementation of such schemes and their operating principles are well known. The encryption scheme may be loaded in to the encryption unit from a data carrier coded to implement the protocol under the direction of a general purpose computer or may be implemented on a chipset as preprogrammed instructions.

In the preferred embodiment described below, the encryption scheme is based on the intractability of the discrete log problem in finite groups and is implemented in an algebraic system defined on the points of an elliptic curve over a finite field, typically referred to as elliptic curve crypto systems. However, the signature scheme proposed may be applied to any ElGamal signature over any finite group.

The domain parameters of such an elliptic curve crypto system are a curve of the form $y^2=x^3+dx+c$ and a seed point P. One of the correspondents has a private key a, $0<a<n$ where n is the order of the point P and a corresponding public key $Q_A=aP$. The public key may be held in a certifying authority 24 shown in communication with the correspondents 10, 12 by ghosted lines.

The messages M generated by the correspondents 10, 12 are subdivided into two bit strings H and V (i.e. M=H//V) where H is a bit string which is hidden and recovered during the verification process and V is a bit string which is also signed but is required as input to the verification process.

Figure 2:
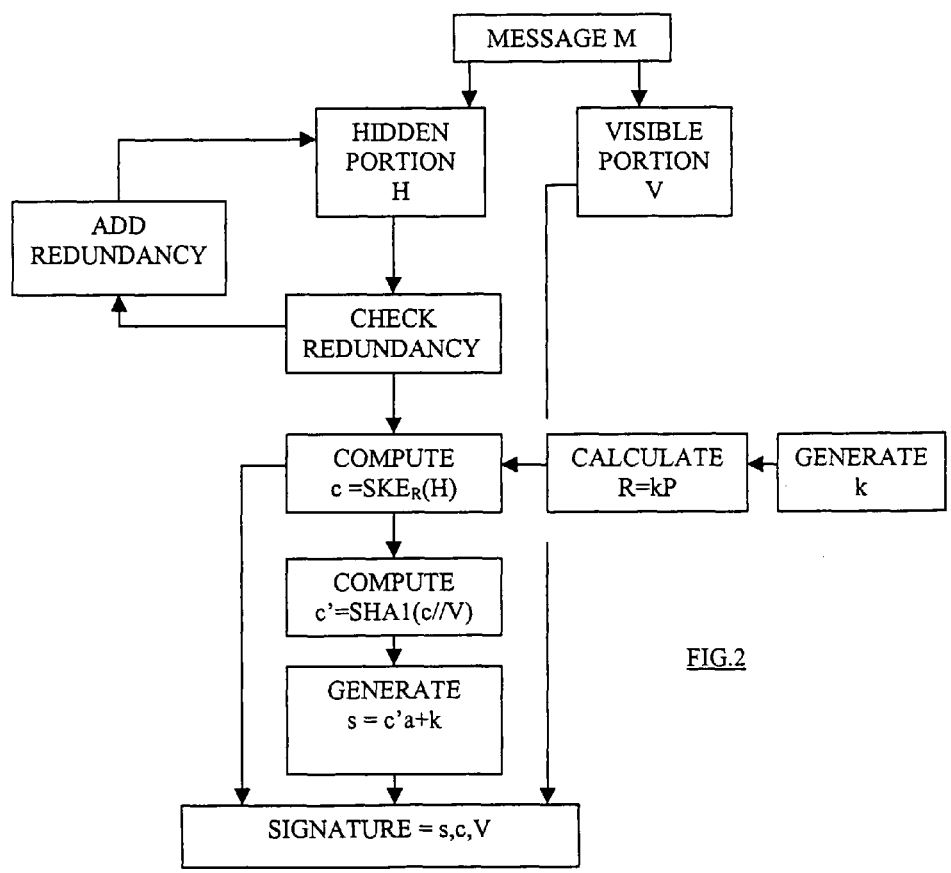
FIG. 2 is a flow chart showing the signature generation.

The signature generation algorithm is set out in the flow chart of FIG. 2. Initially the bit string H is examined to determine if it contains redundancy above a predetermined limit sufficient to prevent an existential forgery attack. If the examination determines that the original data forming the message M contains enough redundancy then H may simply be a subset of that data. If the predetermined redundancy is not found then H may be modified to contain artificially added redundancy such as additional bytes of O's.

By way of example, suppose 80 bits of redundancy is determined to be the predetermined lower limit for security reasons. If the bit string H contains no inherent redundancy then it would be necessary to add up to 10 bytes of 0's. To permit recovery of the message an indicator would be included, conveniently as a leading byte in either H or V, which tells the number of bytes of 0's added. Since the value is 0 to 10, 4 bits of the byte suffice as an indicator so the bit string contains an additional 4 bits of redundancy. If t is the number of redundancy bytes that can be added, then the data must inherently contain at least 80−8t bits of redundancy.

To sign the message M=H//V the correspondent 10 generates a random integer k, $o<k<n$ in the cryptographic unit 14. Using k correspondent 10 then computes a value of a random point R=kP.

A value c is then computed from the bit string H only such that $c=SKE_R(H)$. $SKE_R$ refers to a symmetric-key algorithm under control of a key derived from the random point R. This could be derived by applying a function, such as a hash function, to R, truncating R, or using only one of the coordinates, e.g. the x coordinate as the key. If H is smaller than the key derived from R, then one possible SKE is simply to XOR H with a truncation of bits from the key derived from R. This effectively is a one-time pad. If H is larger than the key it is possible to use a DES based algorithm or simply to XOR repeatedly the key with H.

Using the bit string V, an intermediate component c' is computed such that c'=SHA1 (c//V) where SHA1 is a cryptographically secure hash algorithm. If preferred, additional information such as a certificate or identifying information of correspondent 10 may be incorporated in to the hashed value c'.

It will be noted that the signature component c is the same length as the hidden portion H as it is a bit wise encryption of that portion and that the intermediate component c' is obtained with a single hash operation.

A signature component s is then computed from the values available to the correspondent 10 using any of the known ElGamal equations. A convenient equation is the Schnorr signature algorithm where s=c'a+k (mod n). A signature is then formed from the components (s, c, V) and forwarded to the correspondent 12.

Figure 3:
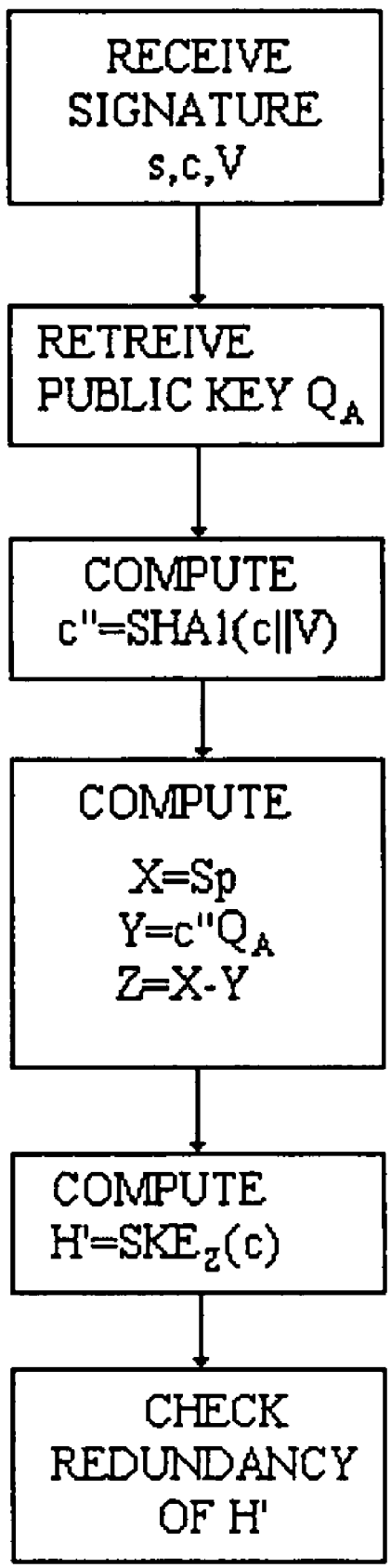
FIG. 3 is a flow chart showing the verification of the signature of FIG. 2.

Verification of the signature by correspondent 12 is performed by the application of the corresponding algorithm, as shown in FIG. 3 for the Schnorr signature. The correspondent 12 initially obtains an authentic copy of the public key $Q_A$ of the correspondent 10 from the certifying authority 24. The correspondent 12 then computes a value c"=SHA1 (c//V) and derives from the information available in the signature, i.e. s, c, V and the system domain parameters, the values X=sP
$Y=c''Q_A$
Z=X−Y A bit string H' is then recovered by applying to the received signature component c the symmetric-key algorithm under control of a key derived from the point Z such that $H'=SKE_Z$ (c). The bit string H' is then examined to determine if it has the required redundancy and if so the correspondent 12 accepts the signature of M and reconstitutes the message as H'//V.

Because the message M is subdivided, it is only necessary for the one portion, H, to contain the requisite redundancy. The other portion V, which is sent in the clear, may have the data structure of the original data and thereby improve the bandwidth efficiency.

Another feature of this scheme which is of practical and commercial interest is that the information encoded in c is only available to those individuals who have the public key $Q_A$ of correspondent 10. The data contained in V is available to all. There may be some information which correspondent 10 wants to hide from those not privy to $Q_A$ in which case the sender, i.e. correspondent 10 puts this information into the bit string H.

For example, in one particular application where the signature is used to authenticate postage applied to mail, a mailer may not want a receiver to know how many mail pieces he has sent. The post office (which verifies postage and therefore needs this information) has the public key of the mailer, and can recover this information on verification but the receiver cannot if he does not have the mailers public key.

Of course, if the public key $Q_A$ of the sender is contained in the indicium then this is also available to the receiver. Alternatively, the senders public key may be contained in a certificate that can only be recovered if the receiver has the certifying authority's public key. If this is not generally available then the contents of H will be hidden from the receiver.

Figure 4:
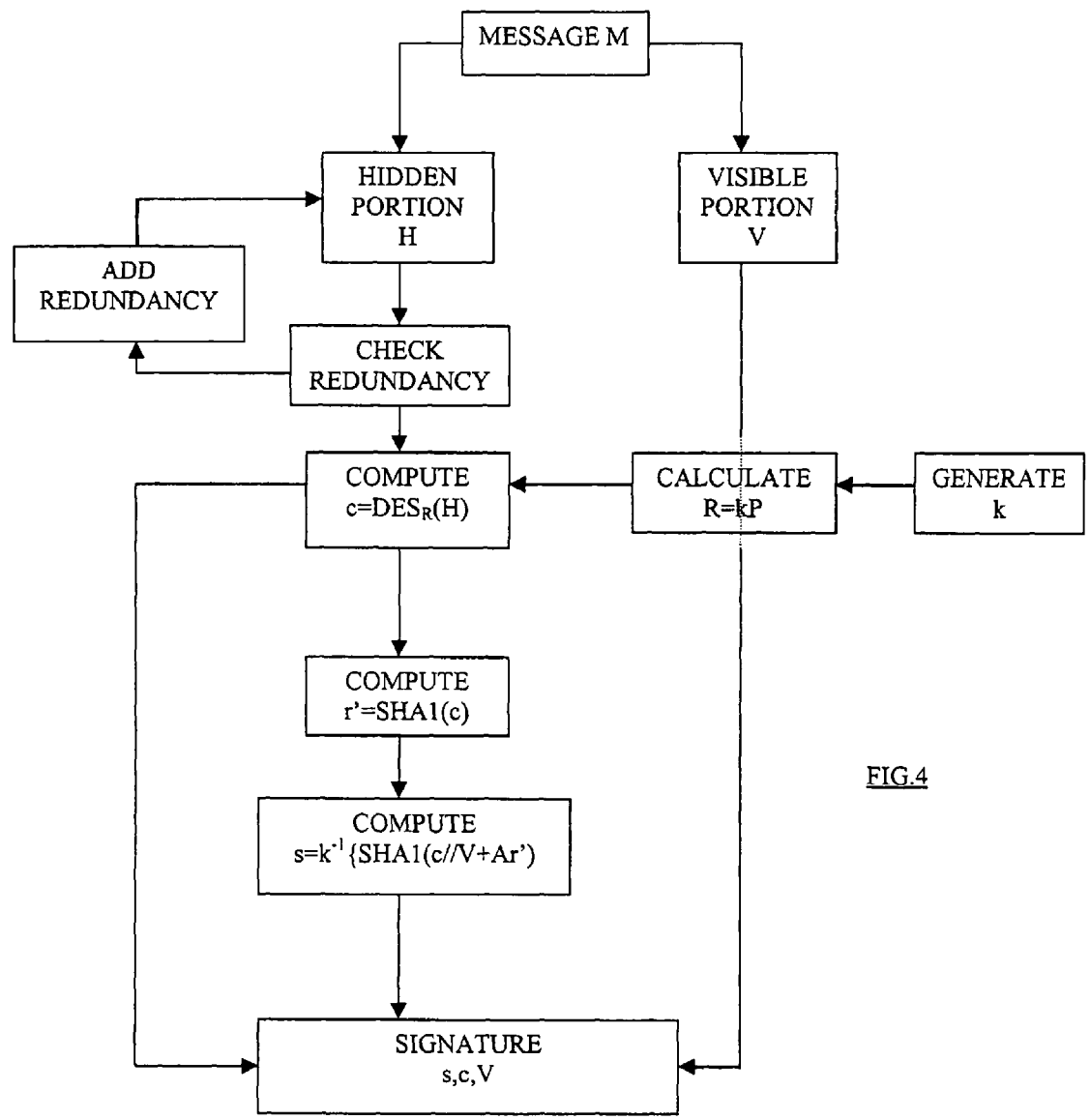
FIG. 4 is a flow chart showing a further embodiment of signature generation.

As indicated above, alternative forms of signing equations may be used. In a further embodiment shown in the flow chart of FIG. 4, a signing equation similar to the ECDSA standard is used. Normally in such an arrangement:

R=kP
$c=DES_R(M)$
r'=SHA1(c)
$s=k^{-1}\{SHA1(c//ID_A)+ar'\}$ mod n where $ID_A$ is an identifier of the sender.
the signature is (s, c).

When used with a hybrid scheme described above the scheme is modified such that

R=kP
$c=DES_R(H)$
r'=SHA1(c)

$s = k^{-1} \{SHA1(c//V) + ar'\} \bmod n$.

the signature is (s, c, V)

Again therefore because only a portion H of the message is used to generate the first component c, only that portion requires a specified redundancy. In the balance of the message a reduced redundancy may be utilised to maintain bandwidth efficiency.

The verification for the modified scheme will change accordingly to accommodate the partial message recovery and necessary redundancy.

We claim:

1. A cryptographic unit for digitally signing a plaintext message exchanged between a pair of correspondents in a data transmission system, one of said pair of correspondents being the signer and having a private key a and a public key derived from the private key a, said public key being available to the other of said pair of correspondents, said cryptographic unit comprising a processor configured for:
   subdividing said plaintext message into a first plaintext bit string H and a second plaintext bit string V;
   computing a first signature component c as a function of said first plaintext bit string H wherein the plaintext bit string H is hidden in said signature component c;
   computing an intermediate signature component c' as a function of said first signature component c and said second plaintext bit string V;
   computing a second signature component s as a function of said intermediate signature component c' and said private key a; and
   forming a signature (s,c,V) containing said first signature component c, said second signature component s, and said second plaintext bit string V as discrete signature components;
   whereby during verification, said second plaintext bit string V is available from said signature (s,c,V) as an input to a verification protocol.

2. The cryptographic unit according to claim 1 wherein redundancy in said first plaintext bit string H is compared to a predetermined level prior to computing said first signature component c.

3. The cryptographic unit according to claim 2 wherein said redundancy is adjusted to exceed a predetermined level.

4. The cryptographic unit according to claim 3 wherein data is added to said first plaintext bit string H to adjust said redundancy.

5. The cryptographic unit according to claim 4 wherein an indicator is included in said first plaintext bit string H to indicate additional data.

6. The cryptographic unit according to claim 1 wherein said second signature component s is generated by hashing said first signature component c and said second plaintext bit string V.

7. The cryptographic unit according to claim 1 wherein said first signature component c is computed by applying a function to said first plaintext bit string H and said first plaintext bit string H may be recovered from said first signature component c by applying a complementary function to said first signature component c.

8. A cryptographic unit according to claim 7 wherein said function is encryption with an encryption key, a decryption key is computable from information available in said signature, and said complementary function is decryption with said decryption key.

9. The cryptographic unit according to claim 8, wherein said encryption key is a short-term key derived from a random integer used in the provision of said second signature component.

10. A cryptographic unit for verifying a plaintext message from a signature of a purported signer in a data transmission system, said plaintext message being subdivided into a first plaintext bit string H and a second plaintext bit string V, said signature formed as a set of discrete components, said signature containing a first component computed as a function of said first plaintext bit string H whereby said bit string H is encrypted therein, and said second plaintext bit string V as a second component, said purported signer having a private key used in the computation of said signature and a corresponding public key available for use in verification, said cryptographic unit comprising a processor configured for:
    receiving said signature;
    generating a value by combining said first component with said second plaintext bit string V;
    recovering said first plaintext bit string H from said value using publicly available information of the purported signer including said public key;
    examining said recovered first plaintext bit string H for a predetermined characteristic; and
    verifying said message if said predetermined characteristic is present.

11. The cryptographic unit according to claim 10 wherein said combination of said first component and said second plaintext bit string V includes hashing a combination of said first component and said second plaintext bit string V.

12. The cryptographic unit according to claim 10 wherein said predetermined characteristic is the redundancy of said recovered first plaintext bit string H.

13. The cryptographic unit according to claim 12 wherein said signature includes a third component derived from a combination of said first component and said second plaintext bit string V and said first plaintext bit string H is recovered utilising said third component.

14. A system for authenticating a communication between a first correspondent and a second correspondent in a data transmission system, said first correspondent having a first processor, a private key a, and a public key derived from the private key a, said public key being available to said second correspondent, said second correspondent comprising a second processor, said system being configured for operating said first and second processors to have:
    said first correspondent subdivide a plaintext message into a first plaintext bit string H and a second plaintext bit string V;
    said first correspondent compute a first signature component c as a function of said first plaintext bit string H wherein the plaintext bit string H is hidden in said signature component c;
    said first correspondent compute an intermediate signature component c' as a function of said first signature component c and said second plaintext bit string V;
    said first correspondent compute a second signature component s as a function of said intermediate signature component c' and said private key a;
    said first correspondent form a signature (s,c,V) containing said first signature component c, said second signature component s, and said second plaintext bit string V as discrete signature components;
    said first correspondent make available to said second correspondent, at least said first signature component c and said second plaintext bit string V;

said second correspondent generate a value by combining said first signature component c with said second plaintext bit string V;

said second correspondent recover said first plaintext bit string H from said value using publicly available information of said first correspondent including said public key;

said second correspondent examine said recovered first plaintext bit string H for a predetermined characteristic; and said second correspondent verify said message if said predetermined characteristic is present.

15. The system according to claim 14 configured for having redundancy in said first plaintext bit string H compared by said first correspondent to a predetermined level prior to computing said first signature component c.

16. The system according to claim 15 wherein said system is configured to permit said first correspondent to adjust said redundancy to exceed a predetermined level.

17. The system according to claim 16 wherein said system is configured so that said first correspondent may add data to said first plaintext bit string H to adjust said redundancy.

18. The system according to claim 17 wherein said system is configured so that said first correspondent may include an indicator in said first plaintext bit string H to indicate additional data.

19. The system according to claim 14 wherein said first correspondent generates said second signature component s by hashing said first signature component c and said second plaintext bit string V.

20. The system according to claim 14 wherein said combination of said first component and said second plaintext bit string V by said second correspondent includes hashing a combination of said first component and said second plaintext bit string V.

21. The system according to claim 14 wherein said predetermined characteristic examined by said second correspondent is the redundancy of said recovered first plaintext bit string H.

22. The system according to claim 21 wherein said signature generated by said first correspondent includes a third component derived from a combination of said first component and said second plaintext bit string V and said first plaintext bit string H is recovered by said second correspondent utilising said third component.

23. The system according to claim 14 wherein said first signature component c is computed by said first correspondent by applying a function to said first plaintext bit string H and said first plaintext bit string H may be recovered by said second correspondent from said first signature component c by applying a complementary function to said first signature component c.

24. The system according to claim 23 wherein said function applied by said first correspondent is encryption with an encryption key, a decryption key is computable by said second correspondent from information available in said signature, and said complementary function performed by said second correspondent is decryption with said decryption key.

25. The system according to claim 24, wherein said encryption key is a short-term key derived from a random integer used in the provision of said second signature component.

* * * * *